United States Patent
Vilke (10) Patent No.: US 11,562,714 B1
(45) Date of Patent: Jan. 24, 2023

(54) REMOTE GENERATION OF AUGMENTED REALITY OVERLAYS

(71) Applicant: Amazon Technologies, Inc., Seattle, WA (US)

(72) Inventor: Stephen Daniel Vilke, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/368,719

(22) Filed: Mar. 28, 2019

(51) Int. Cl.
*G06T 11/60* (2006.01)
*G09G 5/36* (2006.01)

(52) U.S. Cl.
CPC .............. *G09G 5/363* (2013.01); *G06T 11/60* (2013.01); *G09G 2340/12* (2013.01); *G09G 2354/00* (2013.01); *G09G 2370/022* (2013.01); *G09G 2370/04* (2013.01)

(58) Field of Classification Search
None
See application file for complete search history.

(56) References Cited

U.S. PATENT DOCUMENTS

| | | | | |
|---|---|---|---|---|
| 6,404,428 | B1* | 6/2002 | Radecki | G06T 15/00 345/419 |
| 2012/0194517 | A1* | 8/2012 | Izadi | G06T 17/00 345/420 |
| 2017/0069141 | A1* | 3/2017 | Carter | G06T 19/006 |
| 2017/0069143 | A1* | 3/2017 | Salter | G06F 3/013 |
| 2017/0103571 | A1* | 4/2017 | Beaurepaire | G01C 21/3667 |
| 2018/0103072 | A1* | 4/2018 | Liu | H04L 65/1059 |
| 2018/0176535 | A1* | 6/2018 | Ninan | G06F 3/013 |
| 2018/0373327 | A1* | 12/2018 | Todeschini | G02B 27/0093 |
| 2020/0005542 | A1* | 1/2020 | Kocharlakota | G06F 3/0304 |

* cited by examiner

*Primary Examiner* — Steven Z Elbinger
(74) *Attorney, Agent, or Firm* — Davis Wright Tremaine LLP (57) ABSTRACT

An augmented reality device sends data representative of a field of view to a remote system. The field of view is comprises two portions, a first portion displayed to a user of the augmented reality device, and a second portion encompassing an area outside of the first portion. The remote system generates an element of an augmented reality display based on the second portion, and sends the element to the augmented reality device. When movement of the device causes the field of view to shift, the device includes the generated element in the augmented reality display.

20 Claims, 10 Drawing Sheets

REMOTE GENERATION OF AUGMENTED REALITY OVERLAYS

BACKGROUND

An augmented reality device typically generate a version of the real-life surroundings of its user, augmented with additional components that may sometimes be described as graphical overlays. This process may be computationally intensive. At the same time, the computational power of augmented reality devices is typically limited. Furthermore, delays in generating the display can introduce lag, which has been known to induce nausea and other ill effects in the users of augmented reality devices.

BRIEF DESCRIPTION OF THE DRAWINGS

Various techniques will be described with reference to the drawings, in which.

DETAILED DESCRIPTION

Described herein are systems, methods, and computer program products for generating an augmented reality display while leveraging remote resources. Typically, an augmented reality device generate a version of the real-life surroundings of its user, augmented with additional components that can be described as graphical overlays. Because this process may be computationally intensive, and the computational power of augmented reality devices is typically limited, it may be advantageous to offload some or all of the required processing to a remote, scalable computing system. However, doing so may introduce lag.

In an example embodiment, a system comprises at least one processor and at least one memory. The memory comprises instructions that, in response to execution by the at least one processor, cause the system to obtain data representative of a first visual field that corresponds to a visual field perceptible to a user of a device, and to obtain data representative of a second visual field that encompasses an area outside of the first visual field. For example, the second visual field may surround the first visual field. The instructions further cause the system to identify points of interest in the visual field, including in the area outside of the user-perceptible field of view, and generate an element of an augmented reality display based on the identified point of interest. Once generated, the system sends the element to the augmented reality device. There, the augmented reality device generates an augmented reality display, using the element, in response to movement of the visual field perceptible to the user, when that movement causes perceptible field of view to include the point of interest. The point of interest is therefore identified in the second visual field prior to the movement, and the associated element of the display is provided to the augmented reality device prior to the movement. A coordinate system is used to determine a position of the provided element, and to determine when that position falls within the field of view that is perceptible to the user.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including reduction of deleterious lag-based effects and increased offloading of computationally expensive tasks from an augmented reality device to a scalable computing platform.

Figure 1:
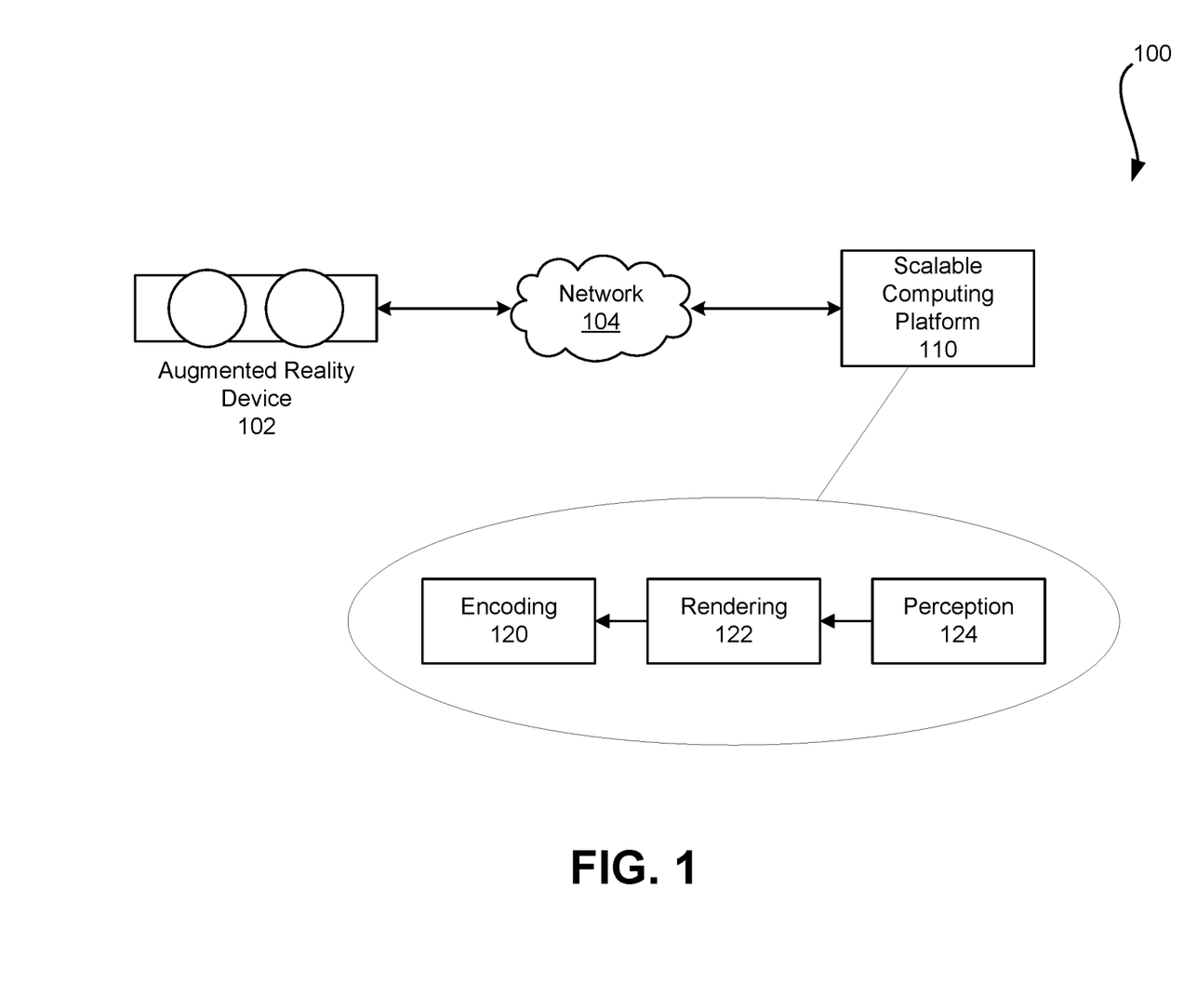
FIG. 1 illustrates a system in which augmented reality overlays are remotely generated.

Aspects of the techniques just described may be further understood in view of FIG. 1, which illustrates a system in which augmented reality overlays are remotely generated. In the example 100 of FIG. 1, an augmented reality device 102 generates an augmented reality display for viewing by a user. As used herein, an augmented reality display refers to the visual content viewed by a user on an augmented reality display device.

In an embodiment, the augmented reality device 102 may include at least one processor, at least one memory for storing instructions executable by the processor, and a display device for displaying the augmented reality display to the user of the device 102. The display device may be any of a number of types of screens, such as light-emitting diode ("LED") screens, organic light-emitting diode screens, projectors, and so forth. The augmented reality device 102 generates an augmented reality display by generating, receiving, or otherwise obtaining one or more frames of visual data compatible with the display device.

The augmented reality device 102 may comprise various movement-sensitive components, such as gyroscopes, global-positioning system ("GPS") sensors, inertial measurement units, magnetometers, and so forth.

The augmented reality device 102 may further comprise a camera which captures visual data corresponding to a field of view that is displayed to the user. For example, in an embodiment, the device 102 includes a camera which captures video data which approximately corresponds to what the user would see without the device. This could be the field of view that is perceptible to the user, given the user and device's current position and orientation. Further, the device includes a camera which captures additional video data for a field of the surrounding area, e.g., the area around the field of view perceptible to the user. This data may be captured by the same camera, by a different camera, or by another device such as an infrared sensor.

The visual field data captured by the augmented reality device 102 can be transmitted, via a network 104, to a scalable computing platform 110. The scalable computing platform may perform various computationally intensive tasks, such as encoding 120, rendering 122, and perception 124.

Perception 124 may include identifying objects represented in the fields of view. Rendering 122 may include generating graphical data, based on an identified object, for inclusion in the augmented reality display generated by the device 102. Encoding 120 may include converting the graphical data to a video format compatible with the device 102.

The scalable computing platform 110 may also be scalable, so as to be able to provide these services to a number of devices similar or identical to the augmented reality device 102. Further, the capabilities of the scalable computing platform 110 can be increased or decreased to meet the needs of the augmented reality device 102.

The scalable computing platform 110 can send elements of the augmented reality scene, via the network 104, to the augmented reality device 102. These elements can include, for example, overlays, partial frames, complete frames, or extra-complete frames that are larger than what is needed by the device to render a frame corresponding to the user's field of view. The augmented reality device 102, having received one or more of these elements, can generate the final augmented reality display for viewing by the user.

Figure 2:
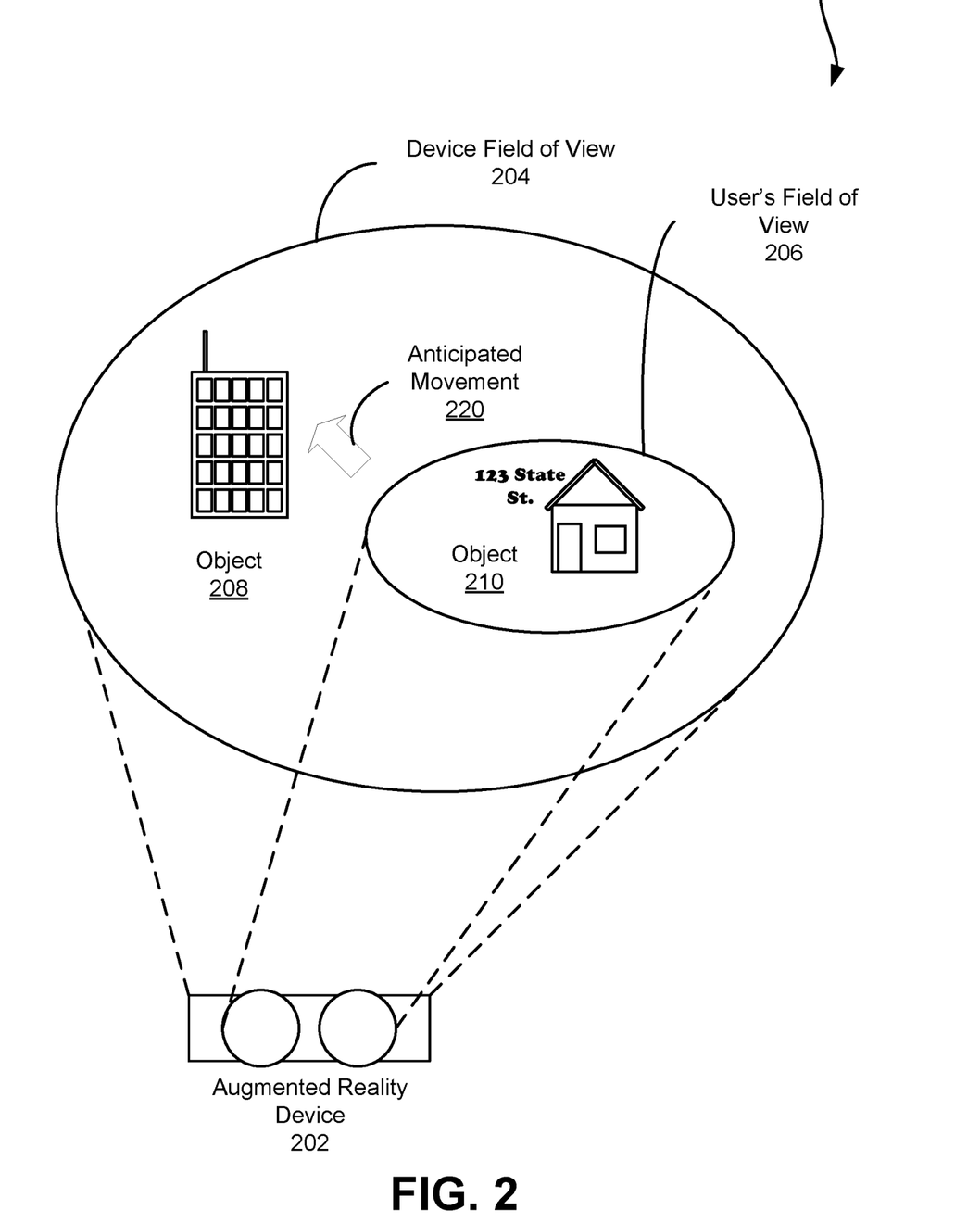
FIG. 2 illustrates a field of view captured by an augmented reality device, in accordance with an embodiment.

Aspects of these techniques may be further understood in view of FIG. 2, which illustrates a visual field captured by an augmented reality device, in accordance with an embodiment. As depicted in the example 200 of FIG. 2, an augmented reality device 202, which may correspond to the device 102 depicted in FIG. 1, captures visual data corresponding to a device field of view 204.

In embodiments, the device field of view 204 is larger than and encompasses the user's field of view 206. The user's field of view 206 may be centrally or near-centrally located within the device field of view 204. Further, the angle covered by the device field of view 204 may be larger than the angle covered by the user's field of view 206. For example, while the user's field of view 206 might only span 120 degrees, the device field of view 204 may capture and record 180 degrees horizontally. In some embodiments, the device field of view may encompass a full 360 degrees. Note that although the present disclosure generally refers to field of view in relation to horizontal angles, similar or identical techniques may be applied in the vertical dimension.

The visual field 204 captured by the device may include representations of various objects 208, 210. A feature of the augmented reality device 202 may include augmenting a display of the user's environment with additional data concerning such objects. For example, within the user's field of view 206, there may be an object 210 corresponding to a house or other structure. It will be appreciated that this example is intended to be illustrative, and as such should not be construed so as to limit the scope of the present disclosure to only those cases and embodiments directed to the specific examples provided.

The augmented reality device 202, in this example case, might display augmented information superimposed onto the user's field of view 206. For example, if the object 210 is a house, the augmented reality device 202 might identify and display the address of the house as a graphical element superimposed over a portion of the user's field of view 206.

The various steps preparatory to and involving the generation of these graphical elements, and of the augmented reality display generally, may involve the use of considerable computational power. In particular, it may involve the use of a remote computing resource, such as the scalable computing platform 110 depicted in FIG. 1. However, lag that might otherwise be introduced by use of a remote resource can be reduced, in accordance with the disclosed techniques.

In an embodiment, the remote computing resource generates elements of an augmented reality display for the device field of view 204, based on an anticipated movement 220 of the user's field of view 206. For example, while a first object 210 might currently be visible to the user, a movement of the user, such as a head rotation or other movement which in turn causes a repositioning or reorientation of the device, might case the user's field of view 206 to move so that it encompasses a second object 208.

In an embodiment, the remote computing resources identify the object 208 in anticipation of such a move, and send elements of an augmented reality display to the augmented reality device. In this way, if the anticipated move occurs, the necessary elements are readily available to the augmented reality device.

Figure 3:
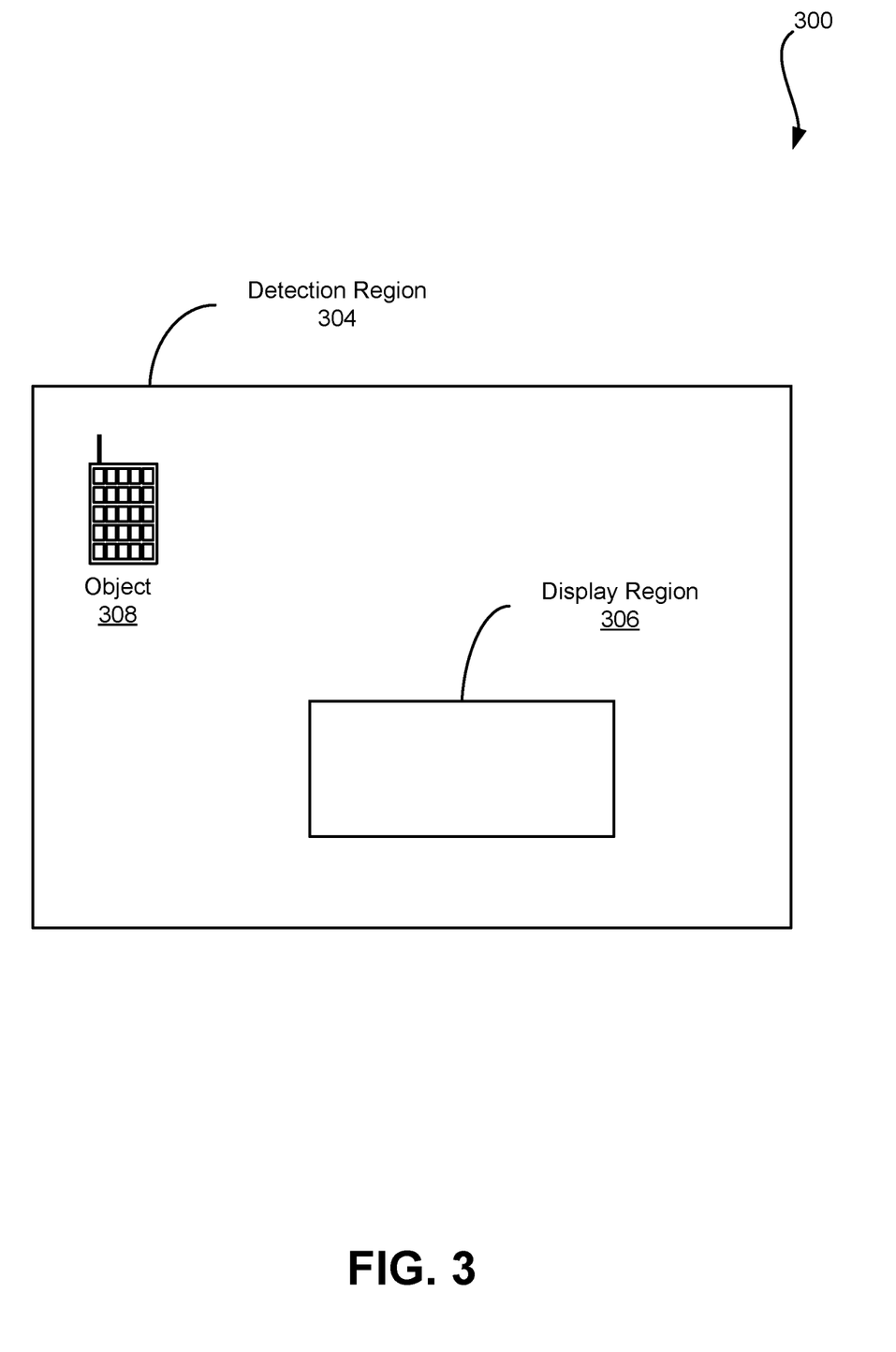
FIG. 3 illustrates further aspects of field of view captured by an augmented reality device, in accordance with an embodiment.

FIG. 3 illustrates further aspects of visual field data captured by an augmented reality device, in accordance with an embodiment. The example 300 of FIG. 3 depicts a detection region 304 and a display region 306. The detection region 304 and display region 306 may correspond to the device field of view 204 and the user's field of view 206 depicted in FIG. 2.

In an embodiment, the detection region 304 comprises data suitable for analysis with respect to augmentation of reality. For example, in an embodiment, the detection region 304 comprises data that is suitable for analyzing order to identify an object 308.

In an embodiment, the display region 306 comprises data suitable for generating elements of an augmented reality display. For example, in an embodiment, a remote system generates frames of an augmented reality display. The data in the display region 306 may therefore be of relatively high quality, since the data may in such cases be presented to the user in close to its original form. In some cases and embodiments, data in the display region 306 is sent to a remote system, augmented (i.e., by adding augmented reality elements to the scene), and sent back to the augmented reality device for display on the devices screen(s).

Data in the detection region 304 may have a relatively low quality, e.g., of lower resolution, than that of the display region 306. The quality should, however, be sufficient to analyze for the purpose of augmentation. For example, in an embodiment, the resolution of the detection region 304 is suitable for identifying the object 308, but less than that of the display region 306. Lowering the resolution of the area surrounding the display region 306 can increase efficiency, since less data is transmitted from the augmented reality device to the remote system.

Figure 4:
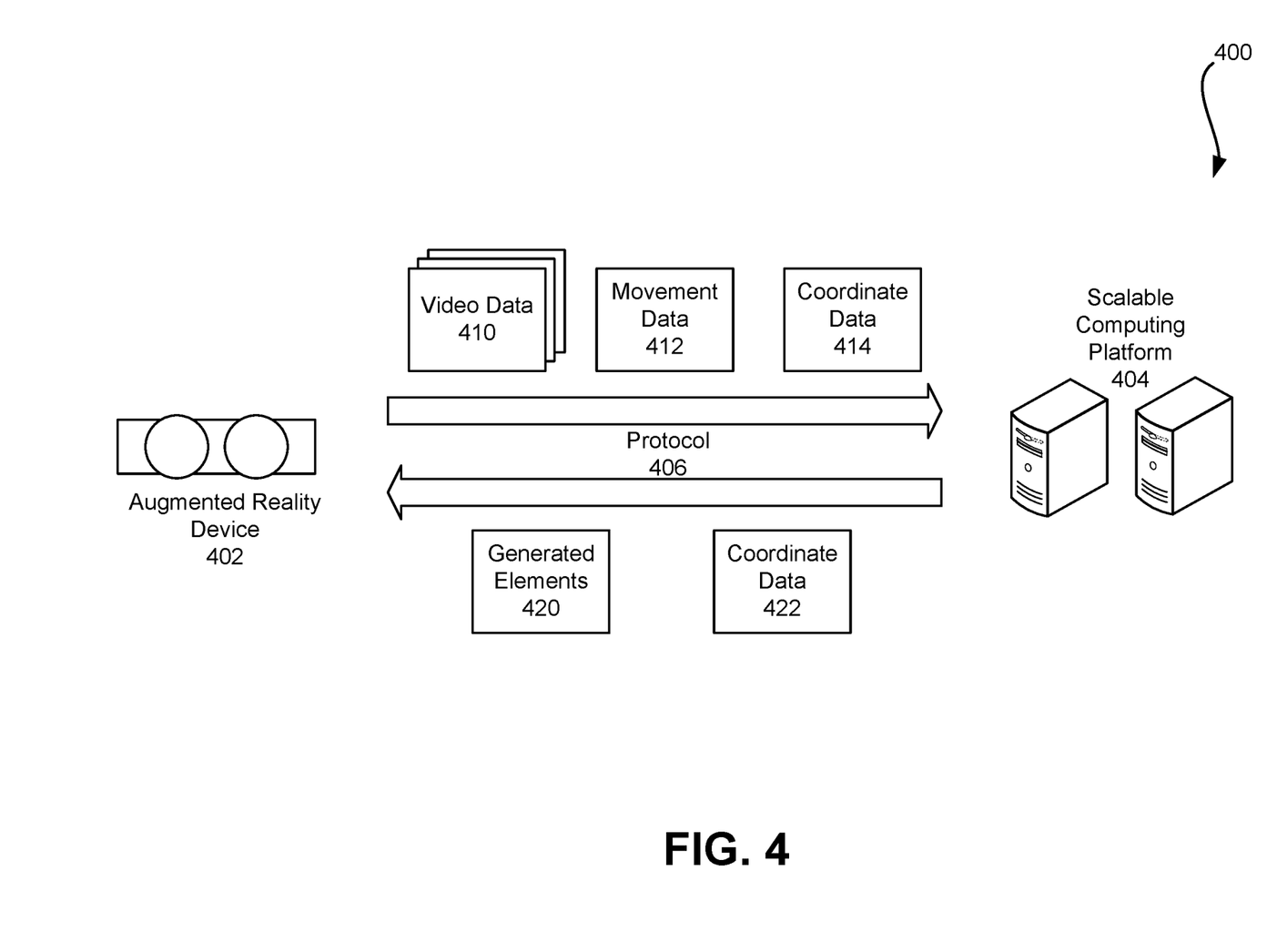
FIG. 4 illustrates a protocol for exchanging field of view data and augment reality overlay data, in accordance with an embodiment.

FIG. 4 illustrates a protocol for exchanging video field data and augment reality overlay data, in accordance with an embodiment. As depicted in the example 400, data may be exchanged between an augmented reality device 402 and a scalable computing platform 404, via a protocol 406.

In an embodiment, the protocol comprises a first stream of data outgoing from the augmented reality device 402 to the scalable computing platform 404, and a second stream in the reverse direction.

In an embodiment, the stream from the augmented reality device 402 to the scalable computing platform 404 comprises video data 410, movement data 412, and coordinate data 414. The video data comprises data corresponding to the device's field of view and the user's field of view. For example, the video data may comprise frames of video data capturing a wide angle compared to the angle of the user's field of view. The video data may therefore be described as having two portions, a first portion corresponding to the user's field of view, and a second portion corresponding to an area outside and surrounding the user's field of view.

In an embodiment, the stream includes movement data 412, comprising data indicative of past, present, or future movement of the device. Although not required, the inclusion of movement data 412 in the stream may permit the scalable computing platform 404 to prioritize certain augmentation elements, so that those elements will be available when the user's field of view shifts in the direction of those elements.

In an embodiment, the stream includes coordinate data 414 which may, in embodiments, be sent from the device 402 to the platform 404. Here, coordinate data refers to information sufficient to map between points of the visual fields, and between those points and a location in the physical space around the augmented reality device 402. The coordinate data 422 sent from the platform 404 to the device 402 can permit the augmented reality device 402 to determine when, where, and whether to include the generated elements 420 in an augmented reality display.

Figure 5:
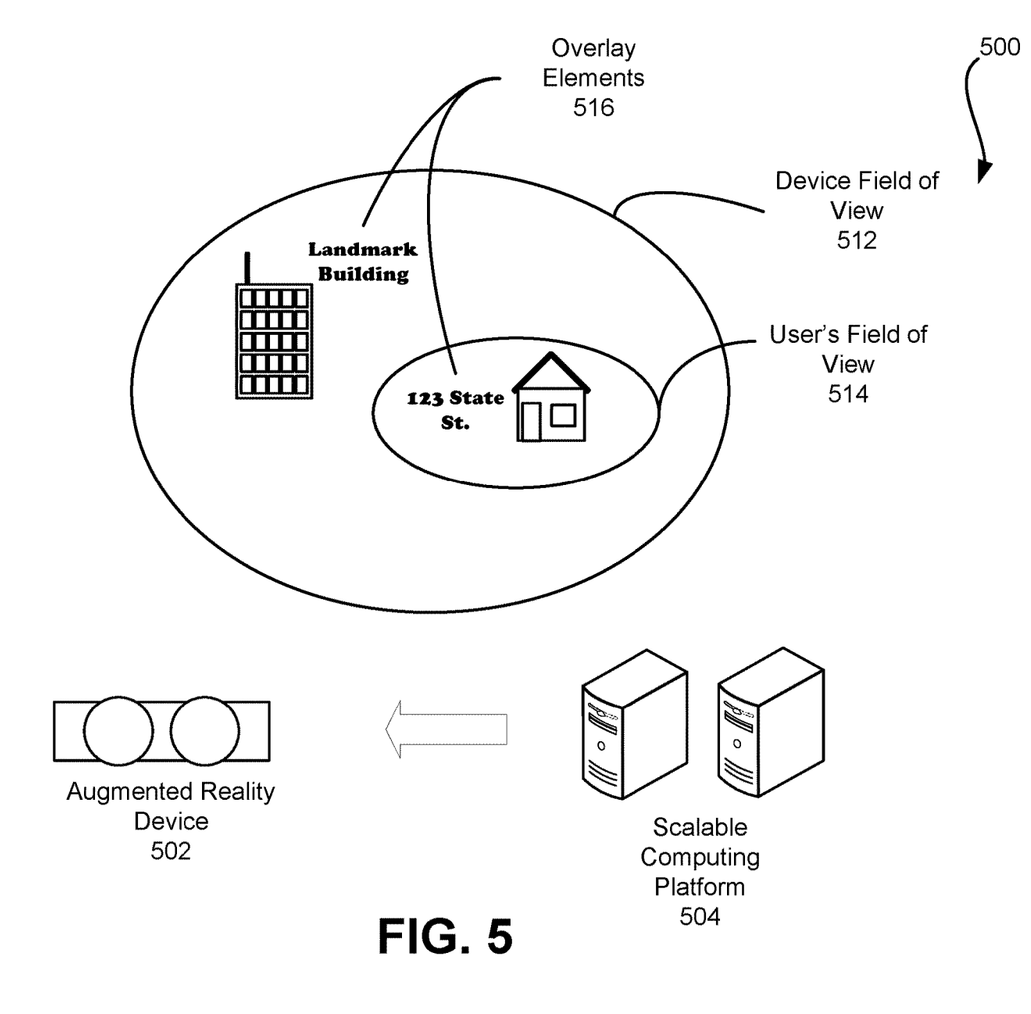
FIG. 5 illustrates overlay elements of an augmented reality display, in accordance with an embodiment.

FIG. 5 illustrates overlay elements of an augmented reality display, in accordance with an embodiment. In the example 500 of FIG. 5, data representative of a device visual field 512, including an encompassed user visual field 514, is sent to a scalable computing platform 504. In some embodiments, the device visual field 512 comprises portions outside of the user visual field 514, but does not fully encompass the user visual field 514. At the platform, overlay elements 516 are generated and sent back to the augmented reality device 502. As seen in the example 500 of FIG. 5, these overlay elements 516 are captions or other graphical elements or indicia that may be superimposed over the field of view. For example, the caption "123 State St." might be overlaid onto the user's field of view 514, near the depicted house. Likewise, the caption "Landmark Building" might be overlaid onto the field of view 512 near the larger building. In the latter case, note that the building, and the corresponding "Landmark Building" caption, are outside of the user's field of view 514. The scalable computing platform 504, in embodiments, generates this overlay element in anticipation of a move of the user's field of view 514. Note that the move does not need to be predicted per se, merely anticipated. In other words, the system may, in at least some embodiments, simply generate whatever overlay elements are intended, based on the contents of the device's field of view 512.

Figure 6:
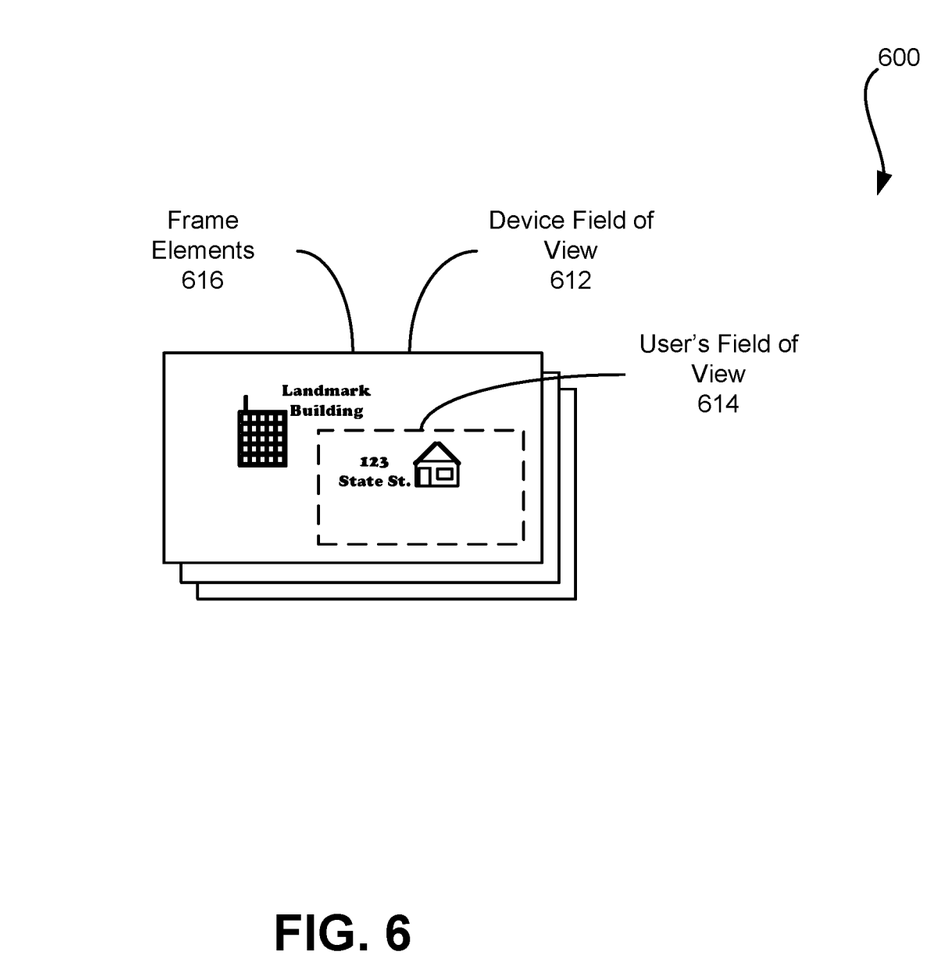
FIG. 6 illustrates frame elements of an augmented realty display, in accordance with an embodiment.

FIG. 6 illustrates frame elements of an augmented reality display, in accordance with an embodiment. The example 600 of FIG. 6 is similar to that of FIG. 5. Here, however, the elements transmitted from the scalable computing platform 504 are frames of video rather than individual overlay elements.

In an embodiment, the size of the frame elements 616 corresponds to the size of the device's visual field. In another embodiment, the size of the frame elements 616 is still larger than the size of the user's field of view 614, but smaller than the size of the device's field of view 612. An augmented reality device, as it receives frame elements 616, may determine which portion of a frame element 616 corresponds to the user's field of view. This portion can then be displayed on the augmented reality device's display screen.

Figure 7:
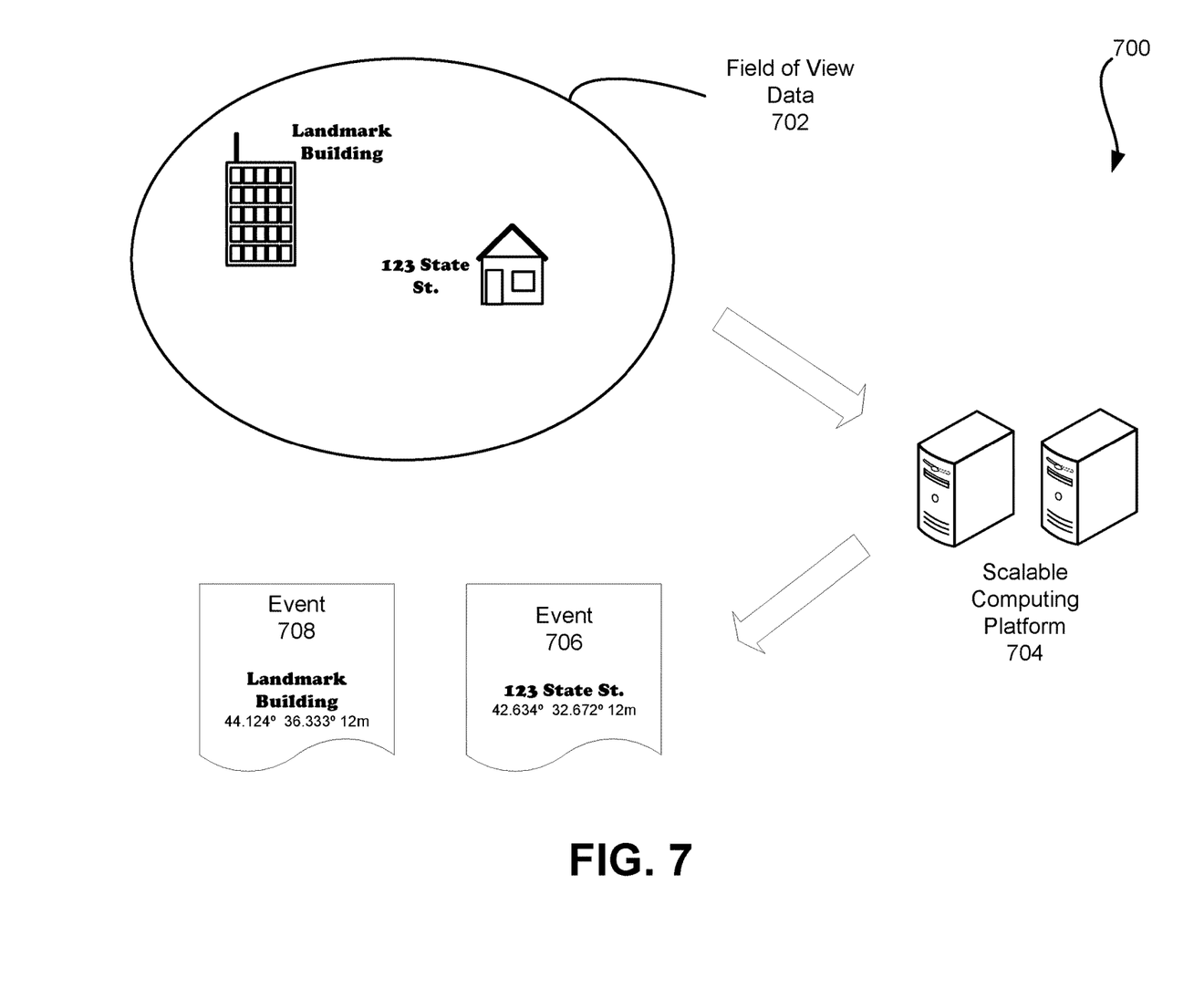
FIG. 7 illustrates event elements of an augmented reality display, in accordance with an embodiment.

FIG. 7 illustrates event elements of an augmented reality display. Event elements, rather than being graphical elements, are data that provide the augmented reality device with information about objects in the field of view. In the example 700 of FIG. 7, an augmented reality device, such as the augmented reality device 102 that FIG. 1 depicts, sends field of view data 702 to a scalable computing platform 704. The scalable computing platform 704 may correspond to the platform 110 depicted in FIG. 1.

In an embodiment, the scalable computing platform 704 analyzes the field of view data 702 and sends events 706, 708 to the augmented reality device. The events 706, 708 describe aspects of the environment represented by the field of view data 702, and can be used by the augmented reality device, in embodiments, to generate an augmented reality display. The field of view data 702 can comprise areas outside of or around the user's field of view. As such, the events generated by the platform 704 and sent to the augmented reality device can pertain to areas not yet in the user's field of view. When the orientation or position of the augmented reality device changes, the new field of view may shift to include an aspect of the environment that pertains to a previously generated event. The augmented reality device may therefore buffer the events received from the platform 704, so that those events may be used in response to a shift in the user field of view.

In embodiments, an event element, such as any one of the depicted events 706, 708, comprises data describing an object identified in the field of view. The event may further comprise data, expressed in a coordinate system such as the one depicted in FIG. 8, that identifies where the relevant object is located.

Figure 8:
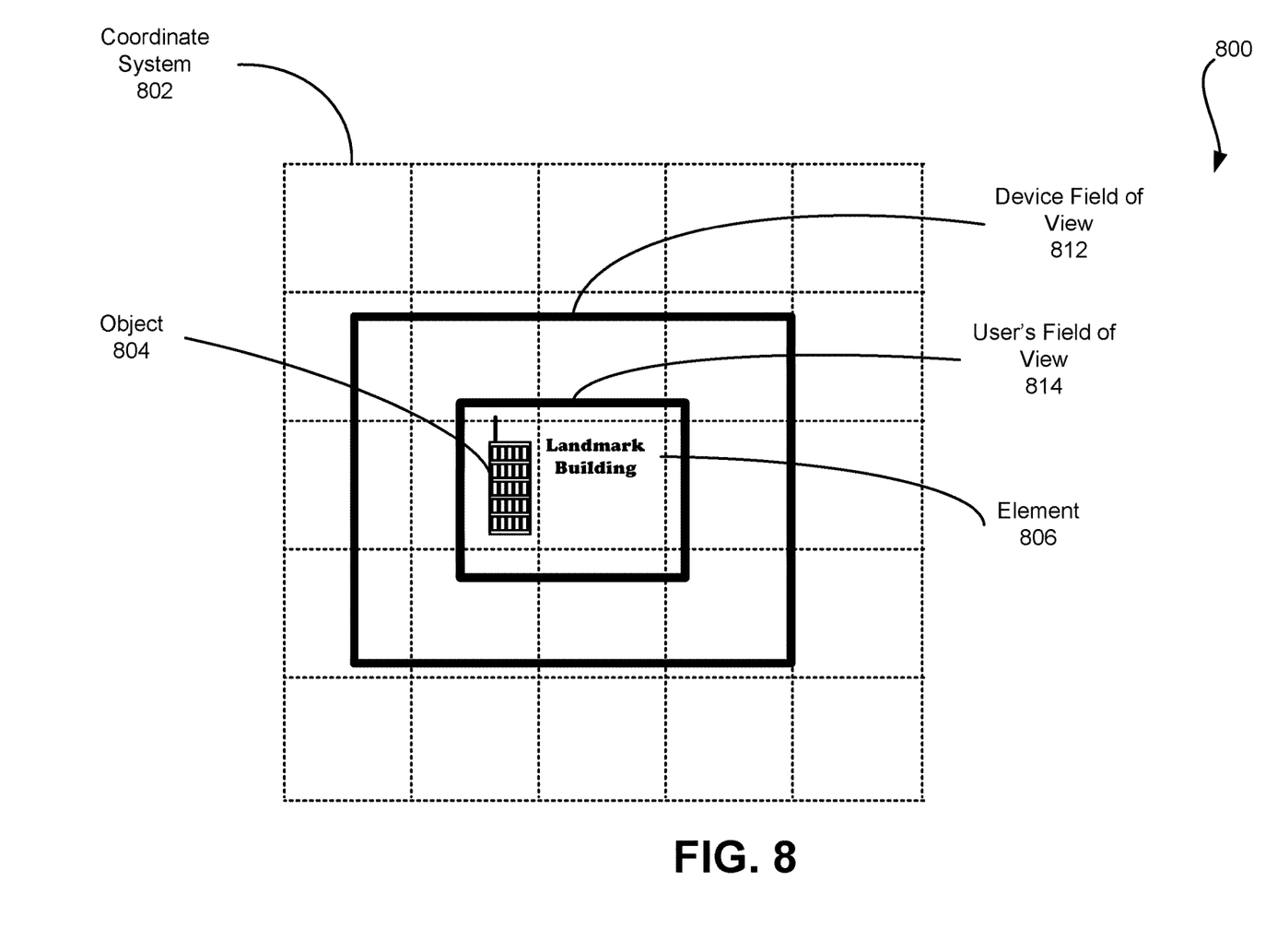
FIG. 8 illustrates a coordinate system for incorporating overlays into an augmented reality display, in accordance with an embodiment.

FIG. 8 illustrates a coordinate system for incorporating overlays into an augmented reality display, in accordance with an embodiment. In the example 800, a coordinate system 802 is used by embodiments of an augmented reality device and a scalable computing platform, such as those depicted in FIG. 1.

In an embodiment, the coordinate system 802 defines points in a physical space around the augmented reality device. In one embodiment, the coordinate system 802 is defined so that the x-dimension of the coordinate space maps to a spherical coordinate system with an origin at the augmented reality device. The coordinate system may be further defined so that polar and azimuthal angles are defined in terms agreed-upon, through pre-definition or data exchange, by the augmented reality device and the scalable computing platform. It will be appreciated that this example is intended to be illustrative, and as such should not be construed so as to limit the scope of the present disclosure to only those embodiments which include the specific example provided.

In general, embodiments of the augmented reality device and scalable computing platform may both utilize an agreed upon coordinate system, so that the scalable computing platform may determine the location of an object identified in a device field of view 812, generate an element of an augmented reality display based on the identified object, and provide the element to the augmented reality device. When provided to the device, the element is tagged or otherwise associated with a coordinate. Upon receiving the element and its associated coordinate, the augmented reality device can determine whether the object 804 is within the user's field of view 814. If so, the augmented reality device can display the element 806 at the appropriate location within the augmented reality display.

Figure 9:
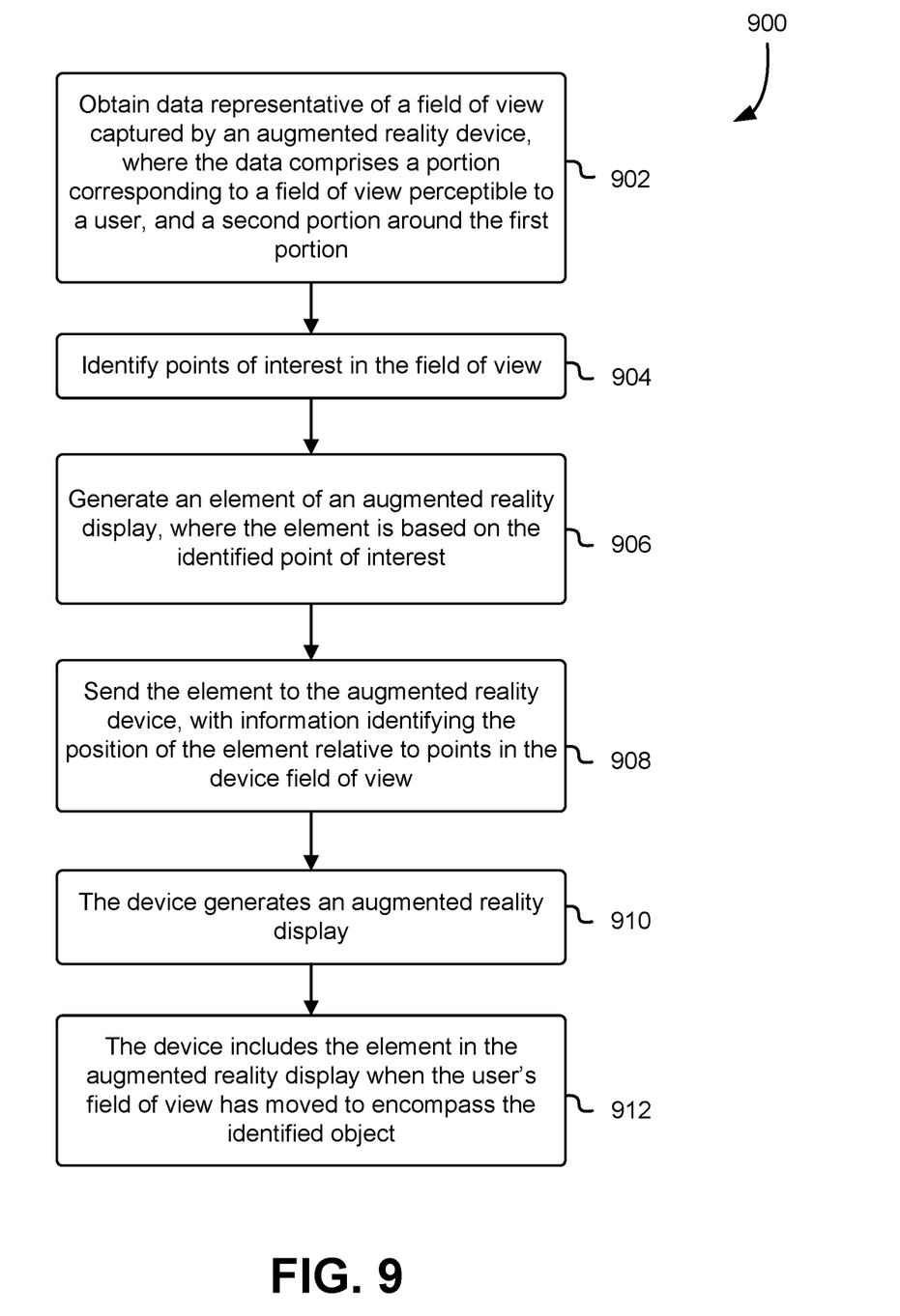
FIG. 9 illustrates an example procedure for generating augmented reality overlays, in accordance with an embodiment.

FIG. 9 illustrates an example procedure for generating augmented reality overlays, in accordance with an embodiment. Although FIG. 9 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 900 may be performed by a scalable computing platform, or other computing resource remote to an augmented reality device. For example, the example process 800 may be performed by the scalable computing platform 110 depicted in FIG. 1, or by the distributed system 1000 depicted in FIG. 10. The example process 800 also illustrates corresponding or associated steps or procedures that may be performed by an augmented reality device, such as the augmented reality device 102 that FIG. 1 depicts.

The example process 900 may comprise one or more operations 902 in which data representative of the field of view is obtained. The field of view may be captured one or more cameras of an augmented reality device, and may include a first portion corresponding to the field of view perceptible to the user of the device, and a second portion corresponding to an area around the first portion. Thus, the second portion may encompass or otherwise be outside of the first portion.

The scalable computing platform, or other system, may therefore obtain data representative of a first field of view and a second field of view, where the second field of view comprises an area around the first field of view. The data representative of the fields of view may be received separately or contemporaneously, and may be received as a unitary collection of data, or as separate collections of data. For example, in an embodiment, a bitmap representing both the first and second fields of views is obtained.

In an embodiment, the area around the first field of view is estimated to be outside of a perceptible field of view. For example, a human's vision may be estimated to have a 120-degree angle, but the augmented reality device may capture and send visual data corresponding to a 180-degree view.

The data representative of the visual fields can be obtained by one or more cameras of the augmented reality. The cameras, individually or in combination, have a field of view that is larger than the field of view that is perceptible to the user.

In an embodiment, the data representative of the second visual field is of lower resolution than the data representative of the first visual field.

In an embodiment, the data representative of the second visual field is sent at a frequency that is different than the frequency with which the data representative of the first visual field is sent.

At 904, the scalable computing platform, or other system, identifies points of interest in the field of view. Here, points of interest refers to objects or other things in the field of view for which the system generates a corresponding augmented reality overlay. For example, the system may identify an object depicted in the field of view.

At 906, the scalable computing platform, or other system, generates an element of an augmented reality display. The element may be generated based at least in partly on the data representative of the second visual field. As such, the element can correspond to an object or other point of interest which is located outside of the user's field of view, but inside the field of view of the device. Note that the user's field of view, as used in the present disclosure, refers to the field of view which is presented to the user via the display screen(s) of the augmented reality device.

The scalable computing platform, or other system, can identify the object or other point of interest in the second visual field, and generate the element, prior to a movement of the first visual field that would cause the first visual field to include the object. By doing so, the experience of a lag can be reduced by sending the generated element to the device prior to the time at which the element is needed.

At 908, the scalable computing platform, or other system, sends the element to an augmented reality device. The element can be sent with associated data indicating where the element should be located. The data can indicate the location using a coordinate system shared with the augmented reality device.

As depicted by element 910, the augmented reality device generates an augmented reality display. For example, the device may generate, receive, or otherwise obtain a series of video frames which it displays on the screen(s) of the device. These frames correspond to the user's field of view, so that the user is provided with the experience of looking at a real-life (i.e., physical) scene, but with additional augmented reality elements overlaid on top of the real-life scene. Note that the position of the displayed scene tracks the user's movements, so that the field of view moves in synchrony with the user's movements.

As depicted by element 912, the augmented reality device generates an augmented reality scene using the received element. It does so in response to a movement of the first field of view that causes the point of interest, and/or the augmented reality element associated with the point of interest, to be included in the first field of view. A position of the element can be determined based on a coordinate system that maps between points in the first and second visual fields.

Figure 10:
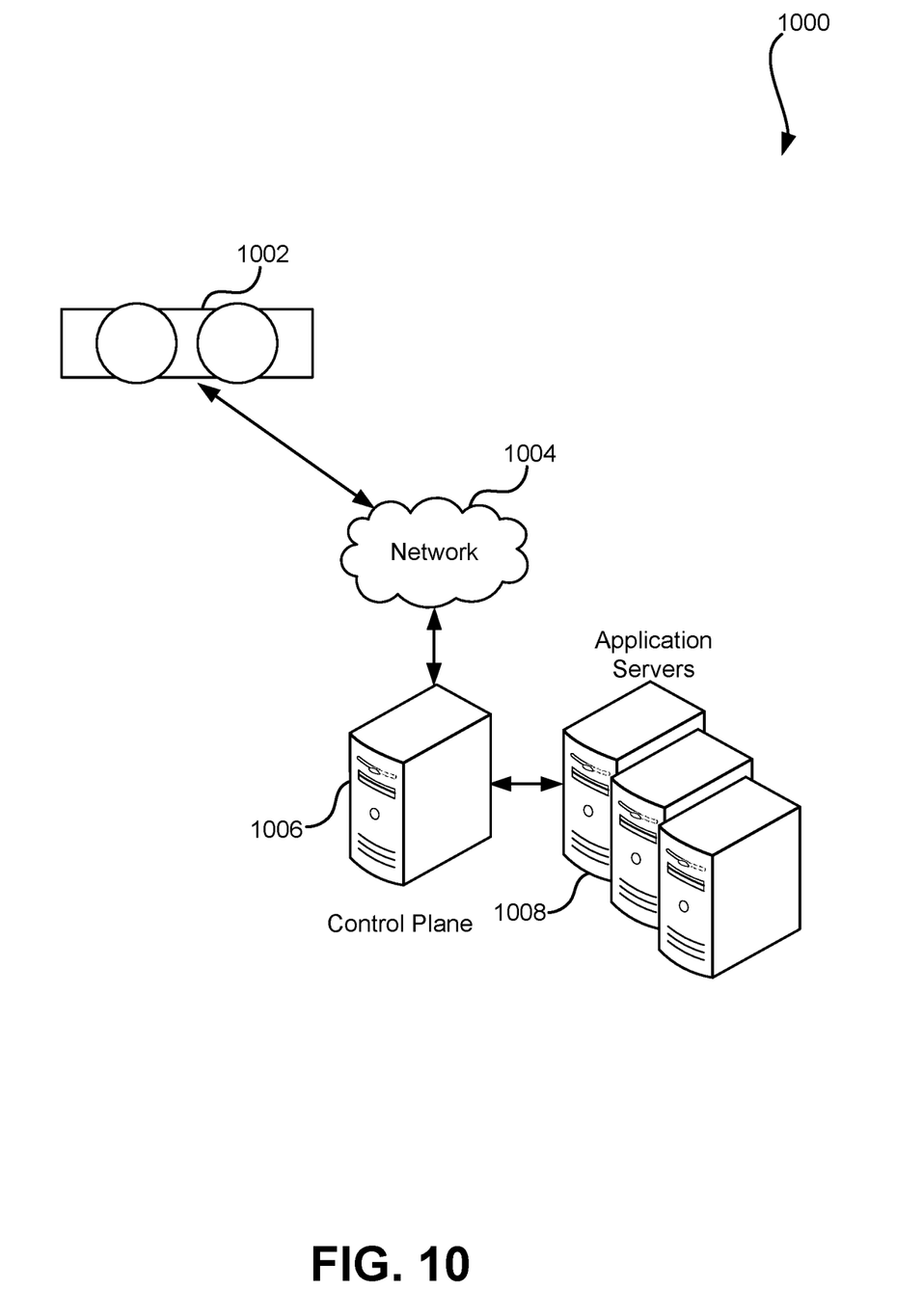
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an augmented reality device 1002, which includes any appropriate device operable to send and/or receive requests, messages, or information over an appropriate network 1004 and convey information back to a user of the device. Examples of such client devices include smart glasses, electronic goggles, cellular or other mobile phones, tablet computers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a control plane 1006 for receiving requests, configuring and managing application servers 1008, load balancing, and so forth. It will be appreciated that, for other networks, an alternative device serving a similar purpose could be used as would be apparent to one of ordinary skill in the art.

In an embodiment, the illustrative system includes some number of application servers 1008, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network.

As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application servers services in cooperation with a data store and generate content including but not limited to text, graphics, audio, video and/or other content that is provided to a the augmented reality device. Content transferred to a client device, in an embodiment, is processed by the client device to provide the content in one or more forms including but not limited to forms that are perceptible to the user audibly, visually and/or through other senses. The handling of all requests and responses, as well as the delivery of content between the augmented reality device 1002 and the application servers 1008, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

In an embodiment, the application servers 1008 perform additional roles and functions, such as the roles of encoding, rendering, and perception as depicted in FIG. 1. These roles and functions may be performed in conjunction with a data store and/or additional related services.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
    at least one processor; and
    at least one memory comprising instructions that, in response to execution by the at least one processor, cause the system to at least:
        obtain, by a transmission protocol, data representative of a first visual field corresponding to a visual field perceptible to a user of a device;
        obtain, by the transmission protocol, data representative of a second visual field perceptible to a camera of the device and encompassing an area outside of the first visual field;
        generate an element of an augmented reality display, the element generated based at least in part on the obtained data representative of the second visual field and an anticipated movement of the visual field perceptible to the user to include a portion of the second visual field; and
        send the element to the device, wherein the device generates the augmented reality display to include the element overlaid onto a display of the second visual field, in response to movement of the visual field perceptible to the user according to the anticipated movement.

2. The system of claim 1, wherein the element is generated based at least in part on an object identified in the second visual field, the object in the area outside of the first visual field prior to the movement.

3. The system of claim 1, wherein the device determines a position of the element based at least in part on a coordinate system mapping between the first and second visual fields.

4. The system of claim 1, wherein the movement causes a point of interest associated with the element to be included in the visual field perceptible to the user.

5. The system of claim 1, wherein the first and second visual fields are obtained by a camera of the device with a field of view larger than the field of view perceptible to the user.

6. A computer-implemented method, comprising:
   obtaining data from an image capture device representative of a first visual field and a second visual field, wherein the second visual field comprises an area outside the first visual field;
   generating an element of an augmented reality display, the element associated with an anticipated movement of the first visual field to include a position in the second visual field, the generating based at least in part on the obtained data representative of the second visual field; and
   sending the element to an augmented reality device, wherein the augmented reality device generates the augmented reality display to incorporate the element into a display of the second visual field, in response to the anticipated movement of the first visual field that causes the first visual field to encompass the position.

7. The computer-implemented method of claim 6, wherein the area outside the first visual field is outside of a field of view perceptible to a user of the augmented reality device.

8. The computer-implemented method of claim 6, further comprising identifying an object in the second visual field.

9. The computer-implemented method of claim 8, wherein the object is identified in the second visual field prior to the movement of the first visual field.

10. The computer-implemented method of claim 6, further comprising determining that the first visual field encompasses the position of the element, based at least in part on a coordinate system mapping between the first and second visual fields.

11. The computer-implemented method of claim 6, wherein the data representative of the first and second visual fields is obtained by a camera of the device with a field of view larger than the field of view perceptible to a user of the augmented reality device.

12. The computer-implemented method of claim 6, wherein the data representative of the second visual field is received at a frequency different than a frequency of receiving the data representative of the first visual field.

13. The computer-implemented method of claim 6, wherein the data representative of the second visual field is of lower resolution than the data representative of the first visual field.

14. A non-transitory computer-readable storage medium comprising executable instructions that, as a result of execution by one or more processors of a computer system, cause the computer system to at least:
   transmit data representative of a first visual field observed by a camera of an augmented reality device;
   transmit data representative of a second visual field observed by the camera encompassing an area outside of the first visual field;
   receive data indicative of an element of an augmented reality display, the element generated remotely based at least in part on the transmitted data representative of the second visual field and an anticipated movement of the first visual field to encompass a portion of the second visual field; and
   in response to the anticipated movement of the first visual field occurring, generate an augmented reality display, based at least in part on the element.

15. The non-transitory computer-readable storage medium of claim 14, wherein the instructions further comprise instructions that, as a result of execution by the one or more processors, cause the computer system to determine a position for placing the element in the first visual field, based at least in part on a coordinate system mapping between points of the first and second visual fields.

16. The non-transitory computer-readable storage medium of claim 15, wherein the coordinate system comprises an additional mapping between points of the first and second visual fields to a physical region around the device.

17. The non-transitory computer-readable storage medium of claim 14, wherein the movement causes an object in the second visual field to be included in the first visual field, and wherein the element of the augmented reality display is generated based at least in part on a representation of the object in the data representative of the second visual field.

18. The non-transitory computer-readable storage medium of claim 14, wherein the camera has a field of view larger than a field of view of the augmented reality display.

19. The non-transitory computer-readable storage medium of claim 14, wherein the element comprises at least one of a graphical overlay, a frame, or an event.

20. The non-transitory computer-readable storage medium of claim 14, wherein the element of the augmented reality display comprises a graphical element to be superimposed on the first visual field in response to the movement.

* * * * *